United States Patent
Redaelli et al.

(10) Patent No.: US 12,360,691 B2
(45) Date of Patent: Jul. 15, 2025

(54) MEMORY DEVICE INITIALIZATION

(71) Applicant: Micron Technology, Inc., Boise, ID (US)

(72) Inventors: Marco Redaelli, Munich (DE); Gaurav Sinha, Unterschleißheim (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/602,370

(22) Filed: Mar. 12, 2024

(65) Prior Publication Data

US 2024/0377974 A1 Nov. 14, 2024

Related U.S. Application Data

(60) Provisional application No. 63/501,570, filed on May 11, 2023.

(51) Int. Cl.
*G06F 3/06* (2006.01)
(52) U.S. Cl.
CPC .......... *G06F 3/0632* (2013.01); *G06F 3/0604* (2013.01); *G06F 3/0679* (2013.01)

(58) Field of Classification Search
CPC ..... G06F 3/0632; G06F 3/0604; G06F 3/0679
See application file for complete search history.

(56) References Cited

U.S. PATENT DOCUMENTS

| | | | |
|---|---|---|---|
| 2016/0364570 A1* | 12/2016 | Stern | G06F 21/575 |
| 2020/0162330 A1* | 5/2020 | Vadapalli | H04L 41/0806 |
| 2024/0220626 A1* | 7/2024 | Dengi | G06F 21/575 |
| 2025/0053659 A1* | 2/2025 | Asbe | H04L 9/30 |

* cited by examiner

*Primary Examiner* — Hiep T Nguyen
(74) *Attorney, Agent, or Firm* — Harrity & Harrity, LLP

(57) ABSTRACT

Implementations described herein relate to memory device initialization. In some implementations, a memory device may perform a first initialization for a first set of memory resources, the first initialization being associated with a boot image initialization. The memory device may enable a sideband interface, for data transfer between the memory device and a host device, based on a completion of the first initialization. The memory device may perform a second initialization for a second set of memory resources that is larger than the first set of memory resources. The memory device may enable a peripheral component interconnect express interface, for data transfer between the memory device and the host device, based on a completion of the second initialization.

20 Claims, 5 Drawing Sheets

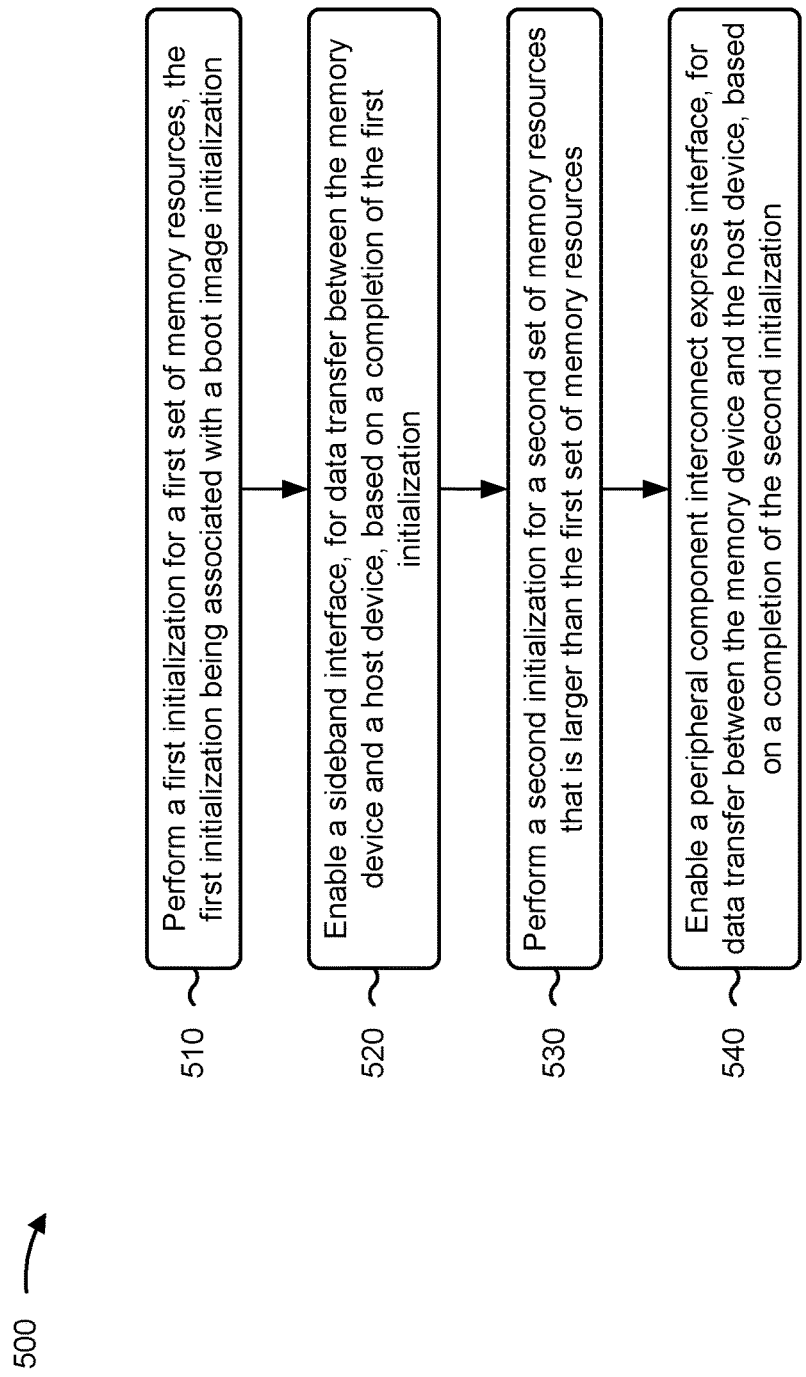

MEMORY DEVICE INITIALIZATION

CROSS-REFERENCE TO RELATED APPLICATION

This Patent Application claims priority to U.S. Provisional Patent Application No. 63/501,570, filed on May 11, 2023, entitled "MEMORY DEVICE INITIALIZATION," and assigned to the assignee hereof. The disclosure of the prior Application is considered part of and is incorporated by reference into this Patent Application.

TECHNICAL FIELD

The present disclosure generally relates to memory devices, memory device operations, and, for example, to memory device initialization.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIG. 5 is a flowchart of an example method associated with memory device initialization.

DETAILED DESCRIPTION

Figure 1:
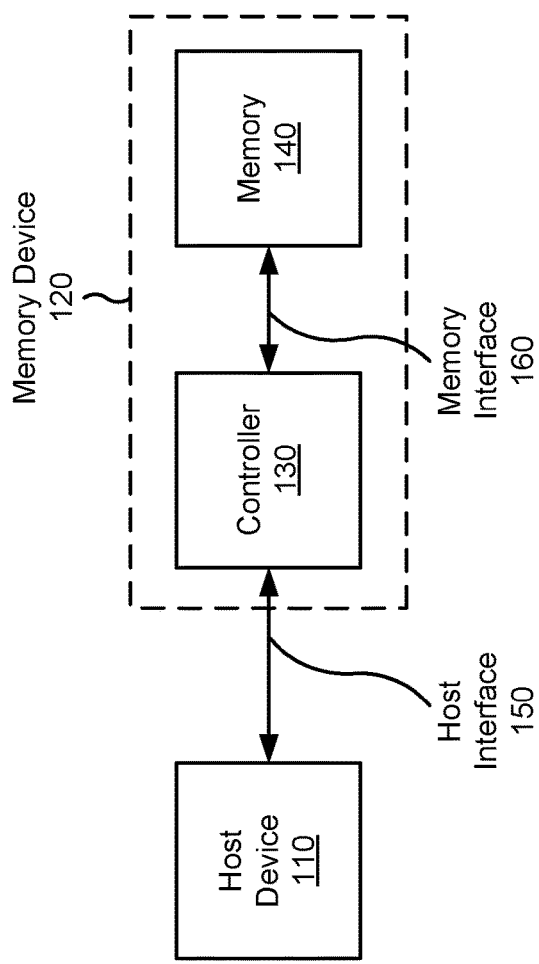
FIG. 1 is a diagram illustrating an example system capable of memory device initialization.

A boot-up process for a memory device may include connecting a power supply to the memory device, loading system firmware into a memory of the memory device, and performing an initialization process for the memory device, among other examples. The initialization process may include setting an initial state for the memory cells of the memory device, establishing an addressing scheme for the memory device, and/or testing the memory of the memory device to ensure that the memory device is operating correctly and reliably. Reducing a boot-up time associated with the boot-up process for the memory device may be important in some applications and systems, such as in embedded and automotive applications and systems. However, certain types of memory devices, such as solid state drive (SSD) memory devices, may have boot-up times that are not able to be reduced. For example, performing a boot-up for an SSD may include establishing a host complex and/or a root complex for transferring data between a host device and the SSD via a bus, such as a peripheral component interconnect express (PCIe) bus. Additionally, the boot-up process for the SSD may include PCIe enumeration, link training, and status state management, among other examples. In some cases, the SSD may be constrained by timing requirements, for example, in accordance with a memory device specification, that requires a delay period before the SSD is able to perform the PCIe enumeration. Thus, SSD memory may not be suitable to be used as a primary boot drive for applications, such as embedded and automotive applications, that require fast boot-up times.

Some implementations described herein enable memory device initialization. A memory device, such as an SSD, may perform a first initialization process for a first set of memory resources. The first initialization process may be associated with a boot image initialization. In one example, the boot image may be associated with an automotive application and may include critical data for starting any system (e.g., a system on chip (SOC) or an electronic control unit) of an automobile that is responsible for starting the engine, transmission, heating and cooling systems, and back-up cameras, among other examples. The memory device may enable a sideband interface based on a completion of the first initialization process. In some implementations, the sideband interface may be a universal asynchronous receiver transmitter (UART) interface, a serial peripheral interface, or a system management bus (SMBus) interface. The memory device may perform a second initialization process for a second set of memory resources. The second initialization process may be associated with a namespace initialization or a complete initialization of the memory resources of the memory device. The memory device may enable a PCIe interface based on a completion of the second initialization process. The PCIe interface may enable faster data transfer and reduced latency as compared to the sideband interface. In some implementations, at least a portion of the first initialization process and the second initialization process may overlap. For example, the memory device may start the first initialization process and the second initialization process at the same time (or approximately the same time), however, the first initialization process may be completed prior to the second initialization process. This may enable the host device and the memory device to use the sideband interface for transferring initial data, such as the critical data for starting the automobile, and to switch to the PCIe interface for faster data transfer after the memory device initialization is complete. Thus, the SSD may be used as a primary boot drive for applications, such as embedded and automotive applications that require fast boot-up times, without relying on other types of memory devices to assist with the initial boot-up and initialization. Additional details are described herein.

FIG. 1 is a diagram illustrating an example system 100 capable of memory device initialization. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an eMMC interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may be configured to perform a first initialization for a first set of memory resources, the first initialization being associated with a boot image initialization; enable a sideband interface, for data transfer between the memory device and a host device, based on a completion of the first initialization; perform a second initialization for a second set of memory resources that is larger than the first set of memory resources; and enable a peripheral component interconnect express interface, for data transfer between the memory device and the host device, based on a completion of the second initialization.

In some implementations, one or more systems, devices, apparatuses, components, and/or controllers of FIG. 1 may be configured to enable a sideband interface for data transfer between the memory device and a host device based on a completion of a first initialization associated with a first set of memory resources, the first initialization being associated with a boot image initialization; and enable a peripheral component interconnect express interface for data transfer between the memory device and the host device based on a completion of a second initialization associated with a second set of memory resources that is larger than the first set of memory resources. One or more other systems, devices, apparatuses, components, and/or controllers of FIG. 1 may be configured to perform a first read operation, via the sideband interface, after a completion of the first initialization but prior to a completion of the second initialization; and perform a second read operation, via the peripheral component interconnect express interface, after a completion of the first initialization and the second initialization.

In some implementations, one or more systems, devices, apparatuses, components, and/or controllers of FIG. 1 may be configured to enable a sideband interface based on a completion of a first initialization associated with a first set of memory resources, the first initialization being associated with a boot image initialization; and enable a peripheral component interconnect express interface based on a completion of a second initialization associated with a second set of memory resources that is larger than the first set of memory resources.

As indicated above, FIG. 1 is provided as an example. Other examples may differ from what is described with regard to FIG. 1.

Figure 2:
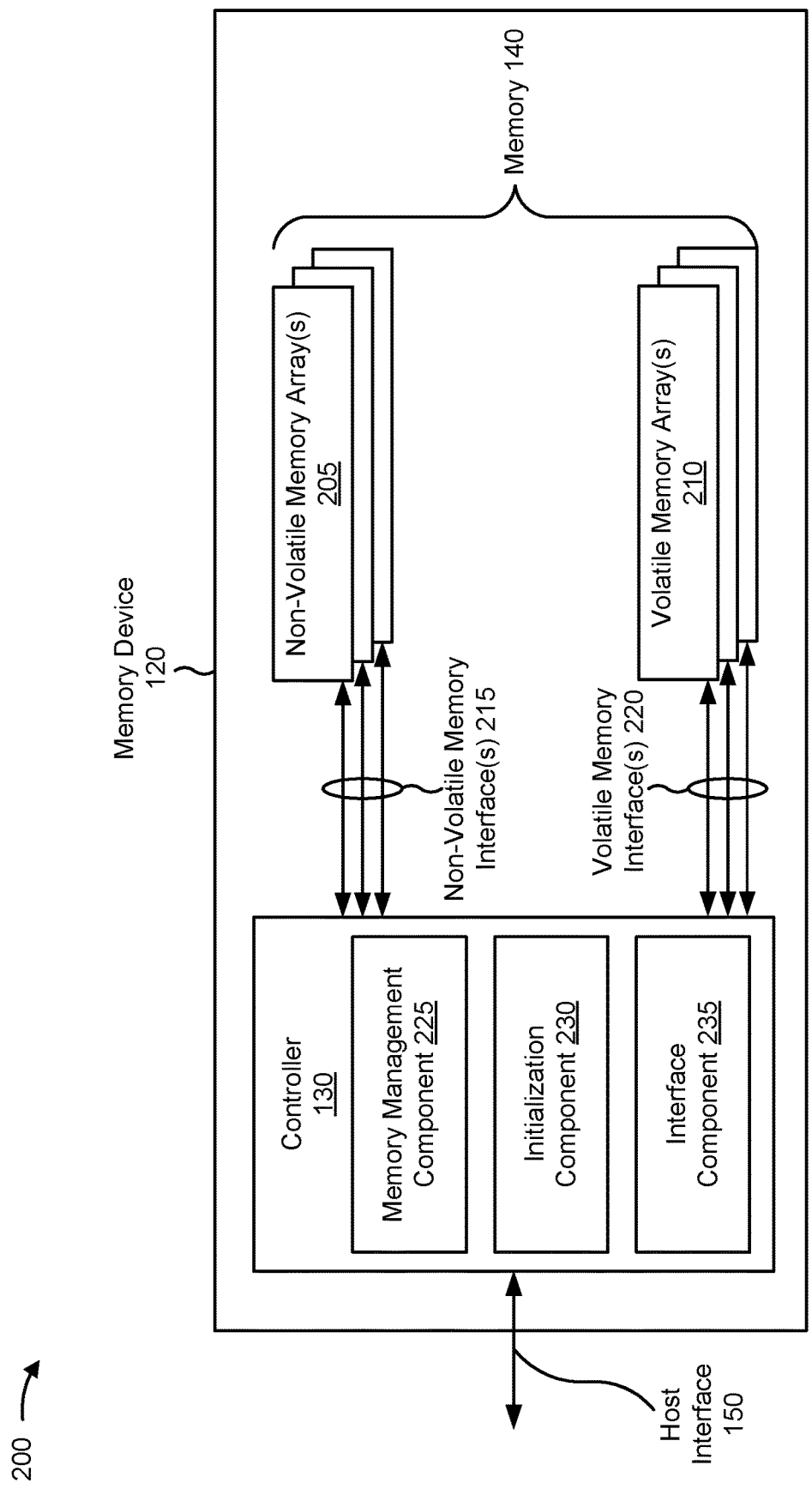
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, an initialization component 230, and/or an interface component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The initialization component 230 may be configured to perform one or more initialization processes for the memory device 120. In some implementations, the initialization component 230 may perform a first initialization process associated with a first set of memory resources and a second initialization process associated with a second set of memory resources. The second set of memory resources may be larger than the first set of memory resources. For example, the first set of memory resources may be associated with a boot image initialization and the second set of memory resources may be associated with a namespace initialization. The initialization component 230 may perform at least a portion of the first initialization process and the second initialization process simultaneously. For example, the initialization component 230 may initiate the first initialization process and the second initialization process at the same time or at approximately the same time, and may perform one or more steps of the first initialization process at the same time as performing one or more steps of the second initialization process. However, the initialization component 230 may complete the first initialization process prior to completing the second initialization process, for example, since the first initialization process requires less data than the second initialization process.

The interface component 235 may be configured to enable one or more interfaces for transferring data between the memory device 120 and the host device 110. The interface component 235 may enable a first interface, such as a sideband interface, in accordance with a completion of the first initialization process. The sideband interface may be a UART interface, a serial peripheral interface, or an SMBus interface, among other examples. The interface component 235 may enable a second interface in accordance with a completion of the second initialization process. The second interface may have a faster data transfer rate than the first interface and may be, for example, a PCIe interface.

One or more devices or components shown in FIG. 2 may be configured to perform operations described herein, such as one or more operations and/or methods described in connection with FIG. 4. For example, the controller 130, the memory management component 225, the initialization component 230, and/or the interface component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
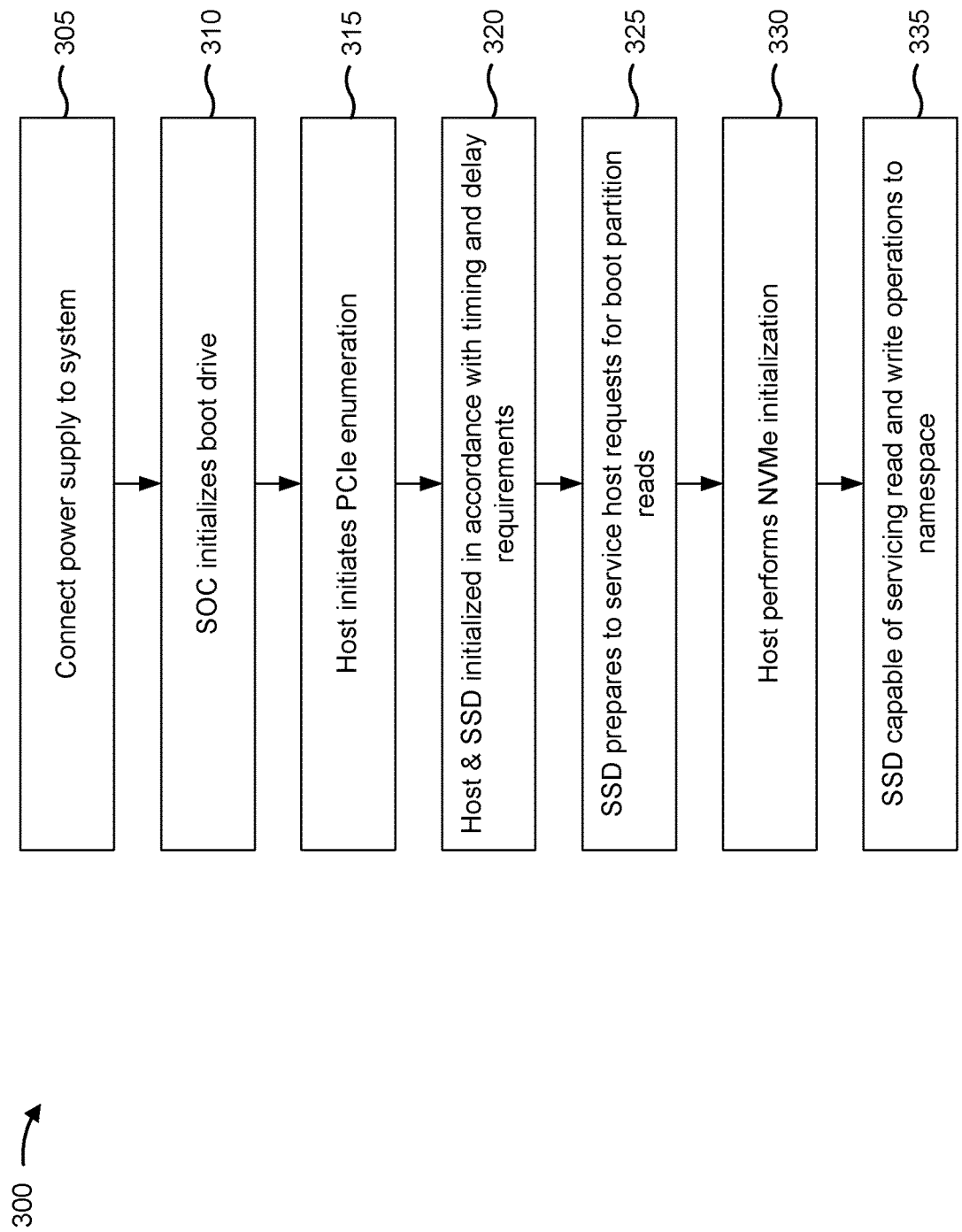
FIG. 3 is a diagram illustrating an example of an initialization process.

FIG. 3 is a diagram illustrating an example 300 of an initialization process. The memory device 120 may perform an initialization process to establish a PCIe link between the memory device 120 and the host device 110. The memory device 120 may be an SSD.

As shown by reference number 305, a power supply may be connected to a system, such as the system 100. The system may include an SOC component. Thus, the power supply may be connected to the system and the SOC. The SOC may be an integrated circuit that includes one or more different types of memory, such as RAM, flash memory, and/or ROM, and may enable fast data transfer between the different components that are connected to the SOC.

As shown by reference number 310, the SOC may initialize a boot drive. The boot drive may include data that is necessary for booting up one or more components included within the system. The boot drive may include NOR memory, electronically erasable programmable read-only memory, and/or an embedded multimedia card, among other examples.

As shown by reference number 315, the host device 110 may initiate a PCIe enumeration process. The PCIe enumeration process may enable the host device 110 to detect one or more devices that are connected to the PCIe bus, such as the memory device 120. Additionally, the PCIe enumeration process may enable the host device 110 to determine one or more features and capabilities associated with the devices that are connected to the PCIe bus, such as an amount of memory and/or input and output capabilities of the devices that are connected to the PCIe bus. In some cases, the enumeration process may be performed in accordance with a location of the memory device 120 within the PCIe topology.

As shown by reference number 320, the host device 110 and the memory device 120 may be configured to perform an initialization process in accordance with timing and delay requirements. In some cases, the host device 110 and the memory device 120 may perform a link training and status state machine (LTSSM) process to establish a PCIe link and to negotiate operating parameters, such as a speed of the link and a number of lanes to be used. This process, among others described herein, may introduce a delay to the boot-up and initialization of the memory device 120. In some cases, the host device 110 and the memory device 120 may be required (for example, in accordance with a specification) to wait a time period before performing the initialization.

As shown by reference number 325, the memory device 120 may prepare to service boot partition reads by the host device 110. A boot partition read may enable the host device 110 to read data associated with loading initial files that are required to start an operating system. Boot partition data may include, for example, bootloaders and configuration files, among other examples.

As shown by reference number 330, the host device 110 may perform NVMe initialization. The host device 110 may perform the NVMe initialization based on detecting that the memory device 120 is ready for full initialization. The host device 110, to perform the NVMe initialization process, may detect and configure one or more NVMe devices, such as the memory device 120, and may assign memory regions and input and output queues for the NVMe devices. Once the memory device 120 is initialized, the host device 110 may access namespaces within the memory device 120 and may begin reading data from and/or writing data to the namespaces within the memory device 120 via the PCIe bus.

As shown by reference number 335, the memory device 120 may service read and write operations to the namespace. For example, the memory device 120 may receive a read command from the host device 110 and may read data from the namespace. Additionally, or alternatively, the memory device 120 may receive a write command from the host device 110 and may write data to the namespace.

The process described in connection with the example 300 may be used to establish a PCIe link between the memory device 120 and the host device 110. The PCIe link may enable high-speed and low-latency data transfer between the memory device 120 and the host device 110. In some cases, a boot partition may be used to reduce an amount of data that is required for the PCIe enumeration. However, the extended boot-up and initialization times for performing the PCIe enumeration may cause the SSD to be unsuitable for certain applications, such as embedded and automotive applications, that require fast boot-up times.

As indicated above, FIG. 3 is provided as an example. Other examples may differ from what is described with regard to FIG. 3.

Figure 4:
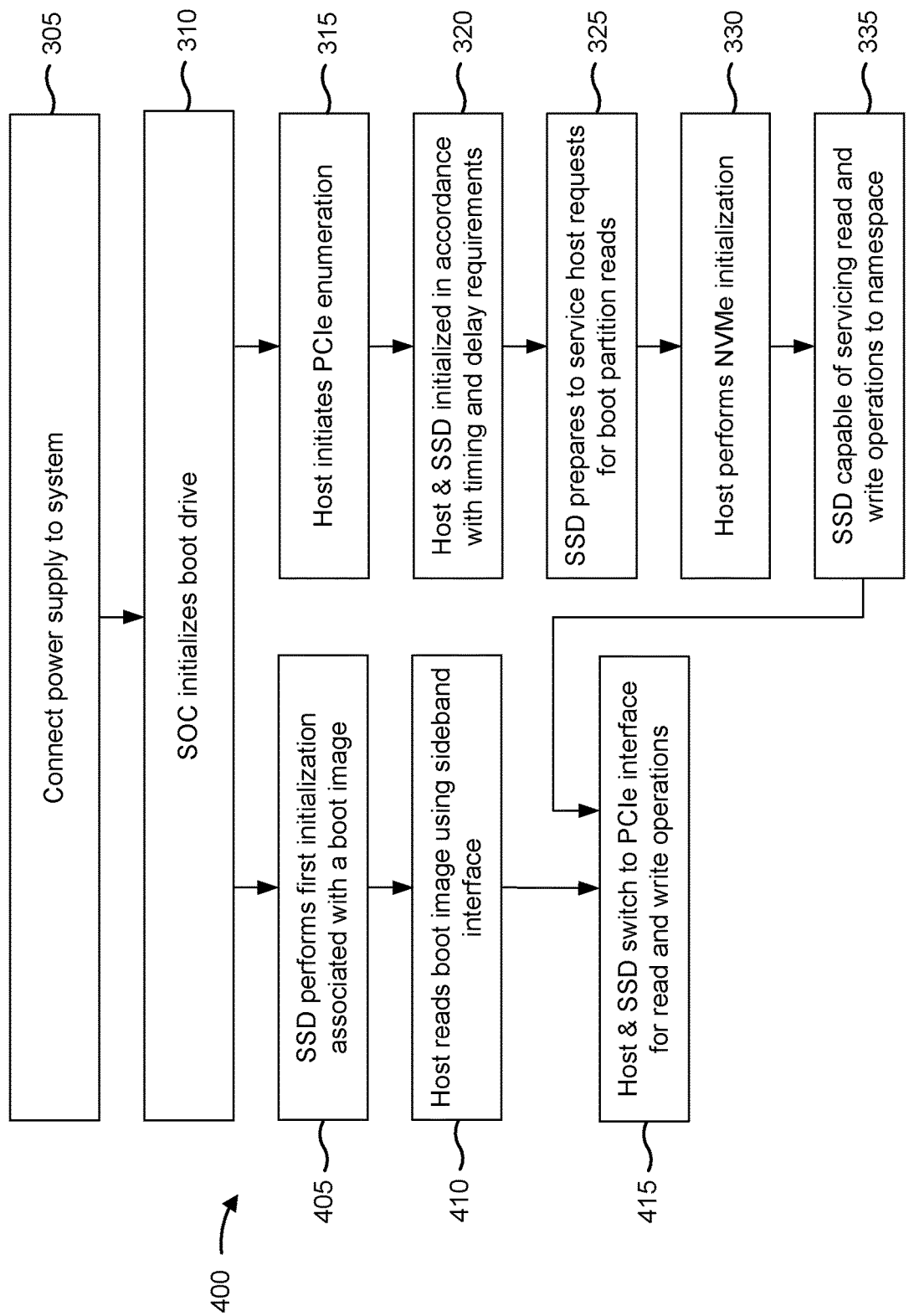
FIG. 4 is a diagram illustrating an example of memory device initialization.

FIG. 4 is a diagram illustrating an example 400 of memory device initialization. The memory device 120 may perform multiple initialization processes for establishing multiple communication links between the memory device 120 and the host device 110. The memory device 120 may be an SSD. In some implementations, the memory device 120 may perform a first initialization process associated with a first set of memory resources and a second initialization process associated with a second set of memory resources, where one or more steps of the first initialization process are performed at approximately the same time as one or more steps of the second initialization process. The first initialization process, as shown by example 400, may be associated with a boot image initialization, and the second initialization process, as shown by example 300, may be associated with a namespace initialization or a complete initialization of the memory resources of the memory device 120. The memory device 120 and the host device 110 may perform one or more steps described above in connection with reference numbers 305, 310, 315, 320, 325, 330, and 335 of FIG. 3.

As shown by reference number 405, the memory device 120 and/or the initialization component 230 may perform the first initialization process. The first initialization process may be associated with initializing a boot image for the memory device 120. In one example, the boot image may be associated with an automotive application, and initializing the boot image may enable an automobile to be loaded with critical data for starting the automobile, such as data associated with starting the engine, transmission, heating and cooling systems, and/or back-up cameras, among other examples. In some implementations, the memory device 120 may start the first initialization process after a power supply is connected to the system (as described in connection with reference number 305) and after an SOC initializes the boot drive (as described in connection with reference number 310).

The memory device 120 and/or the interface component 235 may enable a sideband interface. The sideband interface may be used by the memory device 120 and the host device 110 for transferring data associated with the boot image. In some implementations, the memory device 120 may enable the sideband interface as part of the first initialization process and/or based on a completion of the first initialization process. The sideband interface may be a UART interface, a serial peripheral interface, or an SMBus interface, among other examples.

As shown by reference number 410, the host device 110 may read the boot image using the sideband interface. For example, the host device 110 may perform a read operation using the sideband interface to read data associated with the boot image from the memory of the memory device 120.

As shown by reference number 415, the host device 110 and the memory device 120 may switch to the PCIe interface for read and write operations. The host device 110 and the memory device 120 may switch to the PCIe interface as part of the second initialization process and/or based on a completion of the second initialization process. For example, the host device 110 and the memory device 120 may switch to the PCIe interface after the host device 110 performs the NVMe initialization (as described in connection with reference number 330) and based on the SSD being capable of servicing read and write operations to the namespace (as described in connection with reference number 335). The first initialization process and the second initialization process may be started by the memory device 120 at the same time or approximately the same time. The first initialization process may be completed prior to the second initialization process, for example, since the first initialization process requires less data than the second initialization process. In one example, the first initialization process associated with the boot image initialization may include less than four kilobytes (KB) of data, while the second initialization process associated with the namespace initialization or the complete initialization of the SSD may include more than one terabyte (TB) of data.

The PCIe interface may have a data transfer rate that is faster than a data transfer rate of the sideband interface. The memory device 120 and the host device 110 may use the sideband interface for data transfer after a completion of the first initialization process, for example, since the first initialization process may be completed more quickly than the second initialization process and since the sideband interface does not require a PCIe link to be established between the memory device 120 and the host device 110. However, after the second initialization process is complete and the PCIe link is established between the memory device 120 and the host device 110, the memory device 120 and the host device 110 may switch to the PCIe interface for faster data transfer and reduced latency.

In some implementations, the memory device 120 may support a higher sideband data rate (e.g., higher than a standard data rate) and may enable the sideband interface quickly after the power is applied to the memory device 120. For example, the memory device 120 may support a UART data rate that is greater than 5 megabits per second (Mbps) and may enable the UART interface as soon as power is applied to the memory device 120. In some implementations, the host device 110 may notify the drive regarding which data is to be included in the boot image initialization. For example, the memory device 120 may enable the host device 110 to notify the drive regarding which data is important for the boot image initialization. In some implementations, the memory device 120 may maintain the boot-up data in a state that enables the boot-up data to be serviced quickly (e.g., instantly or almost instantly) after the power to the memory device 120 is stable.

As described herein, the memory device 120 does not need to perform PCIe enumeration to establish the sideband interface. Thus, the sideband interface may be available shortly after power is applied to the memory device 120. This enables the memory device 120 to service the host device 110 read operations over the slower sideband interface while the PCIe enumeration is preparing lanes for fast data transfer. The host device 110 does not need to wait for the enumeration process to complete to perform the initial boot-up sequence for the memory device 120. After the enumeration process is complete, the host device 110 and the memory device 120 may switch to the PCIe interface for faster data transfer and reduced latency. As described herein, this may enable the memory device 120 to be used as a primary boot drive, and may reduce the need for other types of memory, such as NOR, electronically erasable programmable read-only memory (EEPROM), and eMMC, to be used during the boot process.

As indicated above, FIG. 4 is provided as an example. Other examples may differ from what is described with regard to FIG. 4.

FIG. 5 is a flowchart of an example method 500 associated with memory device initialization. In some implementations, a memory device (e.g., the memory device 120) may perform or may be configured to perform the method 500. In some implementations, another device or a group of devices separate from or including the memory device (e.g., the system 100) may perform or may be configured to perform the method 500. Additionally, or alternatively, one or more components of the memory device (e.g., the controller 130, the memory management component 225, the initialization component 230, and/or the interface component 235) may perform or may be configured to perform the method 500. Thus, means for performing the method 500 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 500.

As shown in FIG. 5, the method 500 may include performing a first initialization for a first set of memory resources, the first initialization being associated with a boot image initialization (block 510). As further shown in FIG. 5, the method 500 may include enabling a sideband interface, for data transfer between the memory device and a host device, based on a completion of the first initialization (block 520). As further shown in FIG. 5, the method 500 may include performing a second initialization for a second set of memory resources that is larger than the first set of memory resources (block 530). As further shown in FIG. 5, the method 500 may include enabling a peripheral component interconnect express interface, for data transfer between the memory device and the host device, based on a completion of the second initialization (block 540).

The method 500 may include additional aspects, such as any single aspect or any combination of aspects described below and/or described in connection with one or more other methods or operations described elsewhere herein.

In a first aspect, the sideband interface is a universal asynchronous receiver transmitter interface, a serial peripheral interface, or a system management bus interface.

In a second aspect, alone or in combination with the first aspect, the first initialization is associated with a first completion time and the second initialization is associated with a second completion time that is longer than the first completion time, and performing the second initialization comprises performing a portion of the second initialization while performing the first initialization.

In a third aspect, alone or in combination with one or more of the first and second aspects, enabling the sideband interface comprises enabling the sideband interface based on detecting that power has been applied to the memory device, where the sideband interface has a data transfer rate that is slower than a data transfer rate of the peripheral component interconnect express interface.

In a fourth aspect, alone or in combination with one or more of the first through third aspects, the method further comprises reading a command, from the host device, that indicates data that is to be included in the boot image initialization.

In a fifth aspect, alone or in combination with one or more of the first through fourth aspects, the method further comprises receiving a read command, from the host device via the sideband interface, after a completion of the first initialization but prior to a completion of the second initialization.

In a sixth aspect, alone or in combination with one or more of the first through fifth aspects, the method further comprises receiving a read command, from the host device via the peripheral component interconnect express interface, after a completion of the first initialization and the second initialization.

In a seventh aspect, alone or in combination with one or more of the first through sixth aspects, the memory device is a solid state drive, and the second initialization is associated with a namespace initialization or a complete initialization of the solid state drive.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

In some implementations, a memory device includes one or more components configured to: perform a first initialization for a first set of memory resources, the first initialization being associated with a boot image initialization; enable a sideband interface, for data transfer between the memory device and a host device, based on a completion of the first initialization; perform a second initialization for a second set of memory resources that is larger than the first set of memory resources; and enable a peripheral component interconnect express interface, for data transfer between the memory device and the host device, based on a completion of the second initialization.

In some implementations, a system includes a memory device configured to: enable a sideband interface for data transfer between the memory device and a host device based on a completion of a first initialization associated with a first set of memory resources, the first initialization being associated with a boot image initialization; and enable a peripheral component interconnect express interface for data transfer between the memory device and the host device based on a completion of a second initialization associated with a second set of memory resources that is larger than the first set of memory resources; and the host device, wherein the host device is configured to: perform a first read operation, via the sideband interface, after a completion of the first initialization but prior to a completion of the second initialization; and perform a second read operation, via the peripheral component interconnect express interface, after a completion of the first initialization and the second initialization.

In some implementations, an apparatus includes means for enabling a sideband interface based on a completion of a first initialization associated with a first set of memory resources, the first initialization being associated with a boot image initialization; and means for enabling a peripheral component interconnect express interface based on a completion of a second initialization associated with a second set of memory resources that is larger than the first set of memory resources.

The foregoing disclosure provides illustration and description but is not intended to be exhaustive or to limit the implementations to the precise forms disclosed. Modifications and variations may be made in light of the above disclosure or may be acquired from practice of the implementations described herein. As used herein, the terms "substantially" and "approximately" mean "within reasonable tolerances of manufacturing and measurement."

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
     perform a first initialization for a first set of memory resources, the first initialization being associated with a boot image initialization;
     enable a sideband interface, for data transfer between the memory device and a host device, based on a completion of the first initialization;

perform a second initialization for a second set of memory resources that is larger than the first set of memory resources; and enable a peripheral component interconnect express interface, for data transfer between the memory device and the host device, based on a completion of the second initialization.

2. The memory device of claim 1, wherein the sideband interface is a universal asynchronous receiver transmitter interface, a serial peripheral interface, or a system management bus interface.

3. The memory device of claim 1, wherein the first initialization is associated with a first completion time and the second initialization is associated with a second completion time that is longer than the first completion time, and wherein the one or more components, to perform the second initialization, are configured to perform a portion of the second initialization while performing the first initialization.

4. The memory device of claim 1, wherein the one or more components, to enable the sideband interface, are configured to enable the sideband interface based on detecting that power has been applied to the memory device, and wherein the sideband interface has a data transfer rate that is slower than a data transfer rate of the peripheral component interconnect express interface.

5. The memory device of claim 1, wherein the one or more components are further configured to read a command, from the host device, that indicates data that is to be included in the boot image initialization.

6. The memory device of claim 1, wherein the one or more components are further configured to receive a read command, from the host device via the sideband interface, after a completion of the first initialization but prior to a completion of the second initialization.

7. The memory device of claim 1, wherein the one or more components are further configured to receive a read command, from the host device via the peripheral component interconnect express interface, after a completion of the first initialization and the second initialization.

8. The memory device of claim 1, wherein the memory device is a solid state drive, and wherein the second initialization is associated with a namespace initialization or a complete initialization of the solid state drive.

9. A system, comprising:
a memory device configured to:
enable a sideband interface for data transfer between the memory device and a host device based on a completion of a first initialization associated with a first set of memory resources, the first initialization being associated with a boot image initialization; and
enable a peripheral component interconnect express interface for data transfer between the memory device and the host device based on a completion of a second initialization associated with a second set of memory resources that is larger than the first set of memory resources; and
the host device, wherein the host device is configured to:
perform a first read operation, via the sideband interface, after a completion of the first initialization but prior to a completion of the second initialization; and
perform a second read operation, via the peripheral component interconnect express interface, after a completion of the first initialization and the second initialization.

10. The system of claim 9, wherein the sideband interface is a universal asynchronous receiver transmitter interface, a serial peripheral interface, or a system management bus interface.

11. The system of claim 9, wherein the first initialization is associated with a first completion time and the second initialization is associated with a second completion time that is longer than the first completion time, and wherein the memory device is configured to perform a portion of the second initialization while the memory device is performing the first initialization.

12. The system of claim 9, wherein the memory device, to enable the sideband interface, is configured to enable the sideband interface based on detecting that power has been applied to the memory device, and wherein the sideband interface has a data transfer rate that is slower than a data transfer rate of the peripheral component interconnect express interface.

13. The system of claim 9, wherein the memory device is further configured to read a command, from the host device, that indicates data that is to be included in the boot image initialization.

14. The system of claim 9, wherein the host device is further configured to switch from the sideband interface to the peripheral component interconnect express interface after a completion of the second initialization.

15. The system of claim 9, wherein the memory device is a solid state drive, and wherein the second initialization is associated with a namespace initialization or a complete initialization of the solid state drive.

16. An apparatus, comprising:
means for enabling a sideband interface based on a completion of a first initialization associated with a first set of memory resources, the first initialization being associated with a boot image initialization; and
means for enabling a peripheral component interconnect express interface based on a completion of a second initialization associated with a second set of memory resources that is larger than the first set of memory resources.

17. The apparatus of claim 16, wherein the sideband interface is a universal asynchronous receiver transmitter interface, a serial peripheral interface, or a system management bus interface.

18. The apparatus of claim 16, further comprising means for performing a portion of the second initialization while the apparatus is performing the first initialization.

19. The apparatus of claim 16, wherein the means for enabling the sideband interface comprises means for enabling the sideband interface based on detecting that power has been applied to the apparatus, wherein the sideband interface has a data transfer rate that is slower than a data transfer rate of the peripheral component interconnect express interface.

20. The apparatus of claim 16, wherein the apparatus is a solid state drive, and wherein the second initialization is associated with a namespace initialization or a complete initialization of the solid state drive.

* * * * *